(12) United States Patent
Ishihara

(10) Patent No.: US 11,137,959 B2
(45) Date of Patent: Oct. 5, 2021

(54) PRINTING APPARATUS, SERVER, AND INFORMATION PROCESSING SYSTEM

(71) Applicant: CANON KABUSHIKI KAISHA, Tokyo (JP)

(72) Inventor: Kenta Ishihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/942,912

(22) Filed: Jul. 30, 2020

(65) Prior Publication Data

US 2021/0064309 A1 Mar. 4, 2021

(30) Foreign Application Priority Data

Aug. 30, 2019 (JP) .............................. JP2019-158829

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC .......... *G06F 3/1232* (2013.01); *G06F 3/1205* (2013.01); *G06F 3/1292* (2013.01); *H04N 1/00214* (2013.01)

(58) Field of Classification Search
CPC .... G06F 3/1232; G06F 3/1205; G06F 3/1292; H04N 1/00214
USPC ................................ 358/1.15, 1.1, 1.14, 1.13
See application file for complete search history.

(56) References Cited

U.S. PATENT DOCUMENTS

| 2015/0293729 | A1* | 10/2015 | Sako ...................... G06F 3/1259 358/1.15 |
| 2016/0124685 | A1* | 5/2016 | Mickeleit ........... H04N 1/00244 358/1.15 |
| 2019/0001721 | A1* | 1/2019 | Anai ...................... B41J 29/393 |
| 2020/0177753 | A1* | 6/2020 | Kubo .................... H04N 1/2166 |
| 2020/0280641 | A1* | 9/2020 | Hiramatsu ............ G06F 3/1206 |

FOREIGN PATENT DOCUMENTS

JP  2018-106469 A  7/2018

* cited by examiner

Primary Examiner — Douglas Q Tran
(74) Attorney, Agent, or Firm — Venable LLP

(57) ABSTRACT

Provided is an information processing system capable of changing a point increase condition or method in various ways in a case of giving points depending on printing by a printing apparatus. To this end, the information processing system includes an information processing apparatus, a printing apparatus configured to print an image according to a print instruction transmitted from the information processing apparatus, and a server connected to the information processing apparatus and the printing apparatus via a network. The printing apparatus generates a print log in which at least one identifier out of an application ID unique to a print application in the information processing apparatus and a content ID of the image is associated with a printer ID unique to the printing apparatus, and transmits the print log via the network.

11 Claims, 15 Drawing Sheets

| ITEM | CONTENT | VALUE (EXAMPLE) |
|---|---|---|
| PRINT DATE-TIME | PRINT COMPLETION TIME OF PRINTER | 20191001000000 |
| PRINTER ID | SERIAL NUMBER OF PRINTER | ABCDE123456 |
| MODEL NAME | MODEL NAME | AAAAseries |
| INK REMAINING AMOUNT | AMOUNT OF EACH INK REMAINING 1: INK REMAINS; 2: INK IS EXHAUSTED; 3: UNKNOWN | C:1, M:1, Y:1, K:1 |
| PRINT APPLICATION | APP ID NEW YEAR'S CARD APP: APP-A, PHOTO APP: APP-B | APP-A |
| PRINT CONTENT INFORMATION | CONTENT ID | A111111 |
| SHEET TYPE | 1: PHOTO PAPER, 2: PLAIN PAPER, 3: POSTCARD | 3 |
| SHEET SIZE | 1: PHOTO SIZE, 2: A4, 3: POSTCARD | 3 |
| PRINTED PAGE COUNT | NUMBER OF PRINTED PAGES | 2 |

FIG.8

| APPLICATION NAME | APP ID |
|---|---|
| NEW YEAR'S CARD APP | APP-A |
| PHOTO APP | APP-B |

FIG.10A

| CONTENT NAME | CONTENT ID |
|---|---|
| NEW YEAR'S CARD-Mt. FUJI ILLUSTRATION | A111111 |
| GREETING CARD | B222222 |

| USER ID | EMAIL | PRINTER ID | SERIAL NUMBER | MODEL NAME |
|---|---|---|---|---|
| AAATARO | taro@example.com | AAAAA11 | ABCD10 | MFP Z10 |
| BBBJIRO | jiro@example.com | BBBBB22 | ABVC20 | MFP X20 |

FIG.11B

| PRINTER ID | APP ID | CONTENT ID | SHEET TYPE | SHEET SIZE | PRINTED PAGE COUNT | PRINT DATE-TIME |
|---|---|---|---|---|---|---|
| AAAAA11 | APP-A | A111111 | 3 | 3 | 10 | 20191010000000 |
| BBBBB22 | APP-B | B222222 | 2 | 2 | 1 | 20191040100000 |

FIG.11C

| PRINTER ID | APP-A | APP-B | APP-C | APP-D | OTHERS |
|---|---|---|---|---|---|
| AAAAA11 | 100 | 100 | 0 | 0 | 100 |
| BBBBB22 | 0 | 5 | 100 | 0 | 0 |

FIG.11D

| USER ID | ALLOTTED POINTS |
|---|---|
| AAATARO | 100 |
| BBBJIRO | 10 |

| USER ID | RANK |
|---------|--------|
| AAATARO | GOLD |
| BBBJIRO | SILVER |

FIG.13

| PRINTER ID | APP ID | CONTENT ID | SHEET TYPE | SHEET SIZE | PRINTED PAGE COUNT | PRINT DATE-TIME | RECEPTION DATE-TIME |
|---|---|---|---|---|---|---|---|
| AAAAA11 | APP-A | A111111 | 3 | 3 | 10 | 20191010000000 | 20191010000001 |
| BBBBB22 | APP-B | B222222 | 2 | 2 | 1 | | 20191040100000 |

PRINTING APPARATUS, SERVER, AND INFORMATION PROCESSING SYSTEM

BACKGROUND OF THE INVENTION

Field of the Invention

The present invention relates to an information processing system including a printing apparatus and a service server connected to each other via a network, and an information processing apparatus.

Description of the Related Art

There is known a reward point management system in which points for receiving predetermined services such as free-gift presents and product discounts are given according to a print mode or printing frequency of a printing apparatus, and the points are increased or decreased under a particular condition. Japanese Patent Laid-Open No. 2018-106469 discloses a point management system which manages information transmitted by a printing apparatus and the date-time at which the point management system receives the information, and increases points in a case where, for example, the number of pages printed by a particular printing apparatus within a particular period exceeds an upper limit.

However, in the case where a printing apparatus transmits information and an apparatus which receives the information performs processing as in Japanese Patent Laid-Open No. 2018-106469, the apparatus can perform much more appropriate processing if various kinds of information are transmitted.

SUMMARY OF THE INVENTION

The present invention aims to solve the above problem. Then, the present invention has an object to provide a technique capable of transmitting new information concerning printing.

Further features of the present invention will become apparent from the following description of exemplary embodiments with reference to the attached drawings.

BRIEF DESCRIPTION OF THE DRAWINGS

FIG. 8 is a diagram illustrating an example of a print log;

FIGS. 10A and 10B are tables presenting associations of application names and content names with their respective IDs;

FIGS. 11A to 11D are diagrams illustrating various databases stored in the service provider server;

FIG. 13 is a diagram illustrating a user rank database;

FIG. 15 is a diagram presenting print logs in a case where print date-time and reception date-time are managed individually.

DESCRIPTION OF THE EMBODIMENTS

Hereinafter, embodiments of the present invention will be described in detail with reference to the attached drawings. The following embodiments are not intended to limit the present invention according to the claims. In addition, all the combinations of features described in the embodiments are not necessarily essential for the solution of the present invention.

Embodiment 1

Figure 1:
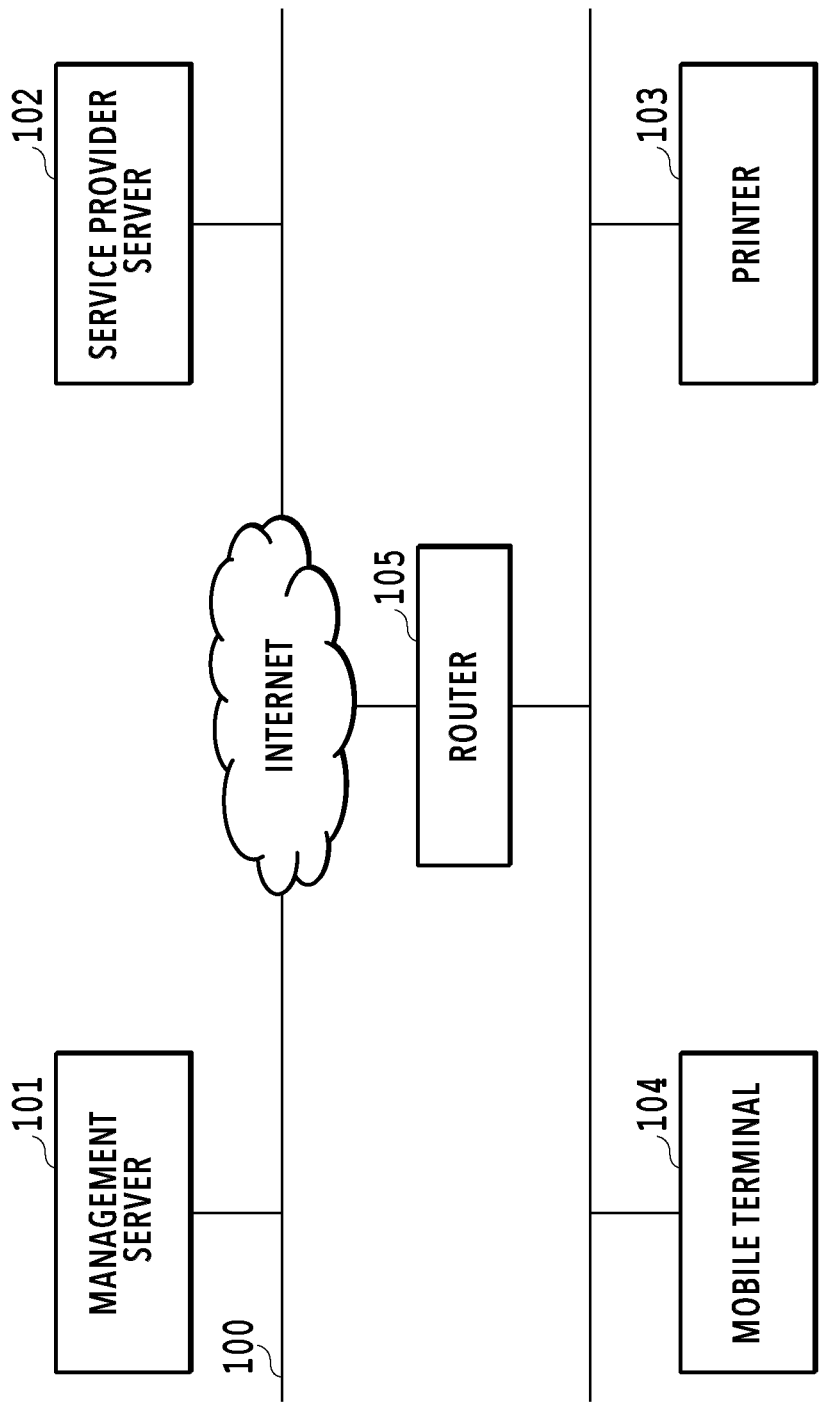
FIG. 1 is a diagram illustrating an example of a system configuration.

FIG. 1 is a diagram for illustrating an example of a system configuration in this embodiment. An information processing system in this embodiment includes a management server 101, a service provider server 102, a printer 103 which is a printing apparatus, and a mobile terminal 104 which is an information processing apparatus.

The management server 101 and the service provider server 102 are each connected to the Internet 100. The mobile terminal 104 and the printer 103 can be connected to the Internet 100 via a router 105. In addition, the printer 103 can be also connected to the mobile terminal 104 via a network such as a LAN in the router 105.

The management server 101 manages information transmitted from the printer 103 and provides management information to the service provider server 102 via the Internet 100. The information transmitted from the printer 103 contains information such as a print content and an application ID of an application which is activated in the mobile terminal 104 in an event where the printer 103 executes a print operation according to an instruction of the mobile terminal 104. On the other hand, the mobile terminal 104 is capable of obtaining the application ID of the application to be activated in the mobile terminal 104, a printable content, and its content ID from the management server 101. As a communication protocol, HTTP or XMPP may be employed, but any other protocol may be also used.

Figure 2:
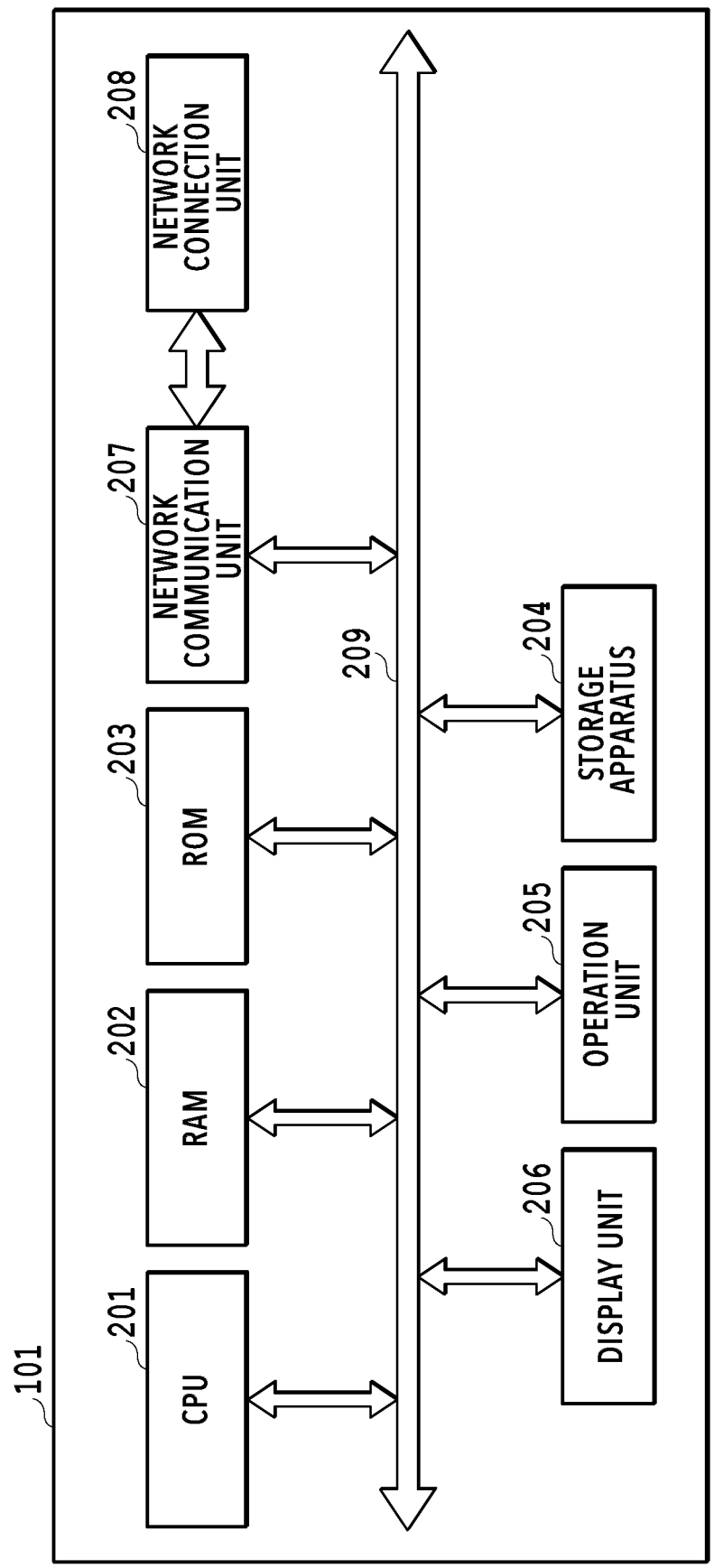
FIG. 2 is a diagram illustrating an example of a hardware configuration of a management server.

FIG. 2 is a diagram illustrating an example of a hardware configuration of the management server 101. The management server 101 includes a CPU 201, a RAM 202, a ROM 203, a storage apparatus 204, an operation unit 205, a display unit 206, a network communication unit 207, and a network connection unit 208.

The CPU 201 is a central processing unit that controls the units and others in the management server 101. The RAM 202 is a work memory needed by the CPU 201 for execution of programs. The ROM 203 is a read-only memory for storing a boot program needed for system activation. The storage apparatus 204 is a non-volatile storage apparatus, such as a magnetic disk or a flash memory, which stores the programs to be executed by the CPU 201 and various kinds of information.

The operation unit 205 includes, for example, a keyboard, a mouse, and so on and receives various input operations from a user. The display unit 206 includes, for example, an LCD and displays various kinds of information to the user. The network communication unit 207 is connected to a network such as the Internet 100 via the network connection unit 208, and performs various communications. The units and others described above are connected to each other via a bus 209.

Figure 3:
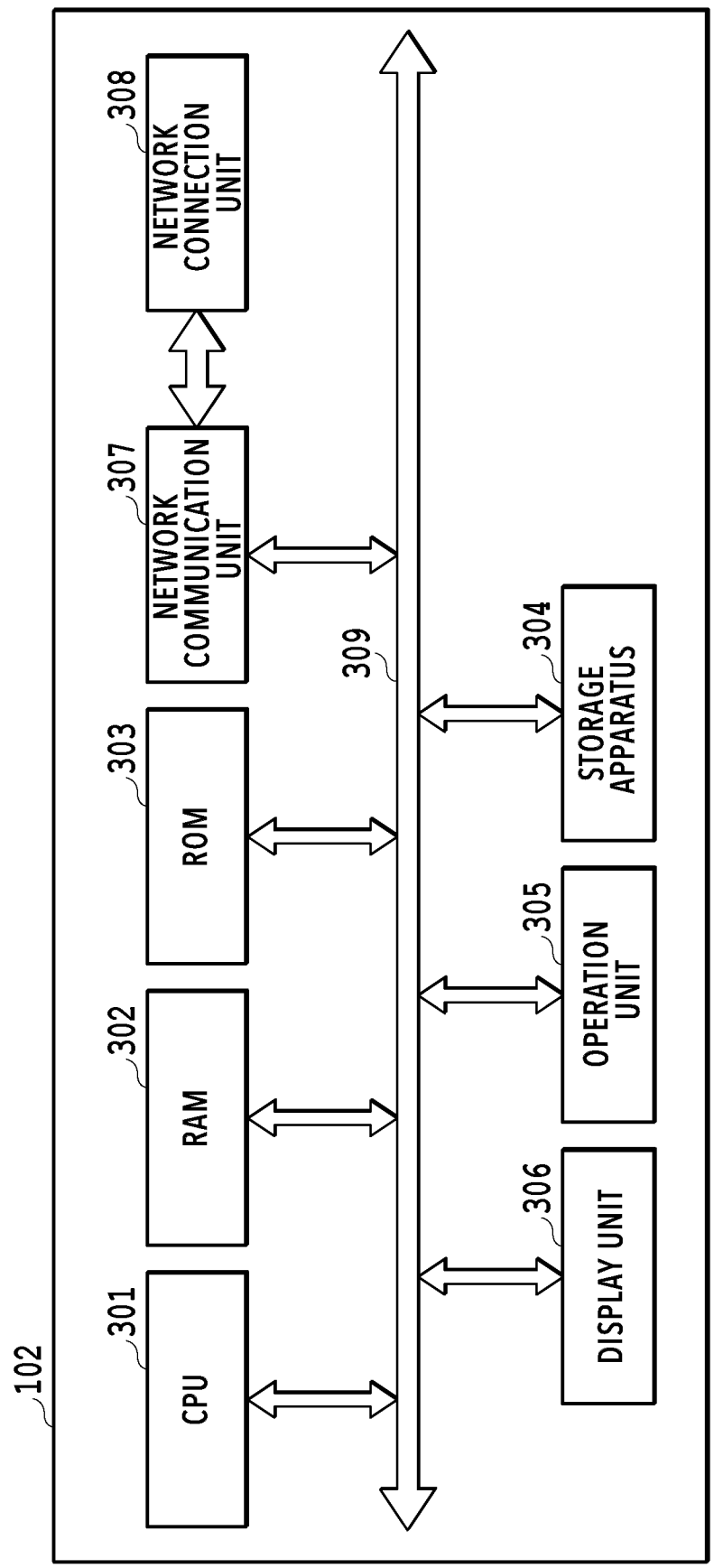
FIG. 3 is a diagram illustrating an example of a hardware configuration of a service provider server.

FIG. 3 is a diagram illustrating an example of a hardware configuration of the service provider server 102 that functions as a service server in this embodiment. The service provider server 102 includes a CPU 301, a RAM 302, a ROM 303, a storage apparatus 304, an operation unit 305, a display unit 306, a network communication unit 307, and a network connection unit 308.

The CPU 301 is a central processing unit that controls the units and others in the service provider server 102. The RAM 302 is a work memory needed by the CPU 301 for execution of programs. The ROM 303 is a read-only memory for storing a boot program needed for system activation. The storage apparatus 304 is a non-volatile storage apparatus, such as a magnetic disk or a flash memory, which stores the programs to be executed by the CPU 301 and various kinds of information.

The operation unit 305 includes, for example, a keyboard, a mouse, and so on and receives various input operations from a user. The display unit 306 includes, for example, an LCD and displays various kinds of information to the user. The network communication unit 307 is connected to a network such as the Internet 100 via the network connection unit 308, and performs various communications. The units and others described above are connected to each other via a bus 309.

Figure 4:
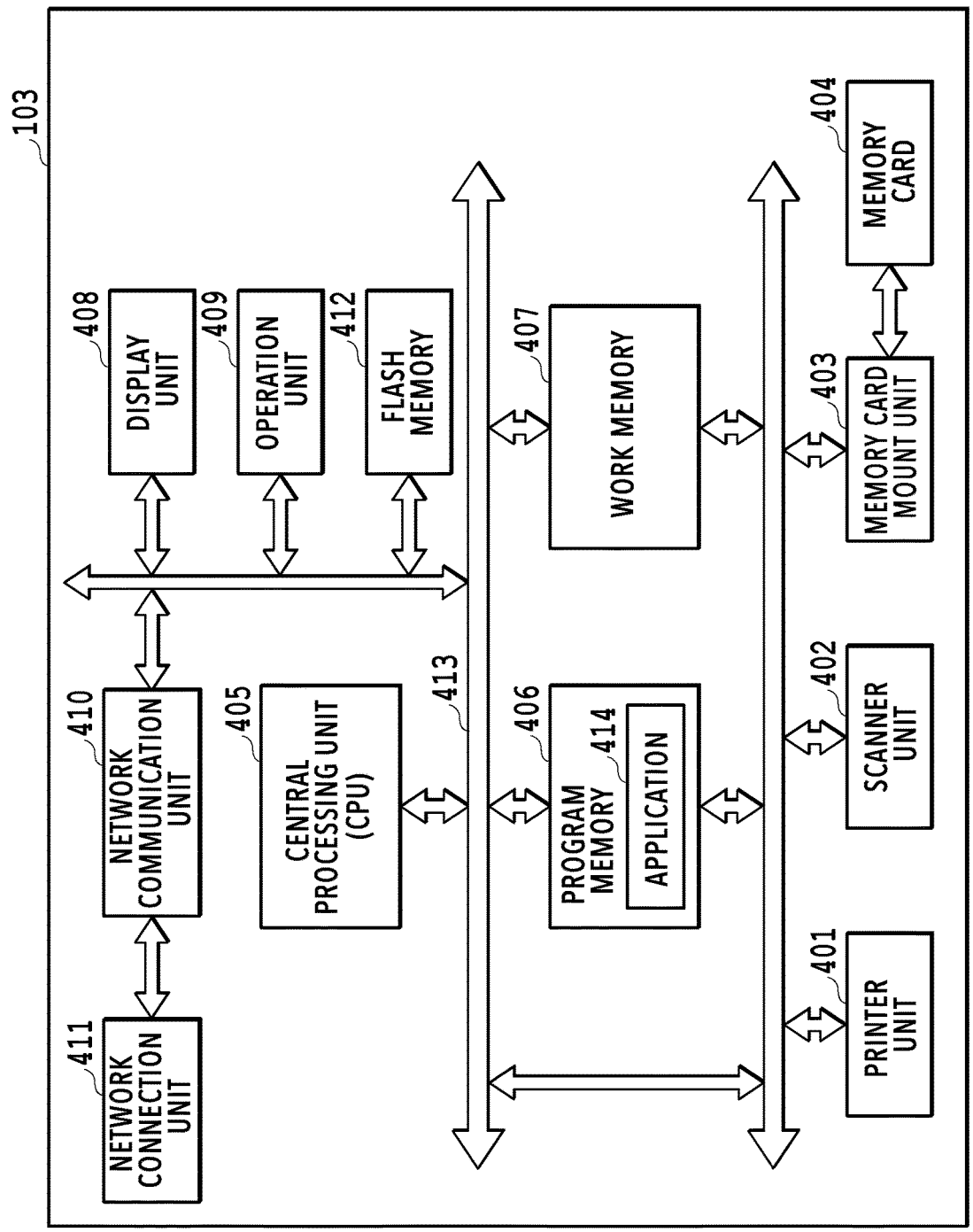
FIG. 4 is a diagram illustrating an example of a hardware configuration of a printer.

FIG. 4 is a diagram illustrating an example of a hardware configuration of the printer 103. The printer 103 in this embodiment is an image processing apparatus as a multifunctional printer, and includes a printer unit 401 that implements print functions, and a scanner unit 402 which implements scan functions. In addition, the printer 103 includes a memory card mount unit 403, a CPU 405, a program memory 406, a work memory 407, a display unit 408, an operation unit 409, a network communication unit 410, a network connection unit 411, and a flash memory 412. The memory card mount unit 403 is a unit on which a memory card 404 can be demountably mounted.

The printer unit 401 prints images on print sheets according to image data received from outside or image data stored in the memory card 404 in a printing scheme such as an ink jet scheme or electrophotographic scheme. The printer unit 401 manages ink information such as types of mounted inks and the ink remaining amounts and sheet information such as a sheet type and the number of loaded sheets.

The scanner unit 402 optically reads an original set on a platen, converts it into electronic data, and saves the electronic data in the work memory 407. The CPU 405 converts electronic data saved in the work memory 407 into a designated file format, and transmits the resultant data to an external apparatus via the network, or stores it in a storage area (such as an HDD) not illustrated. The CPU 405 is capable of implementing a copy function by causing the printer unit 401 to execute a print operation according to the electronic data.

The memory card 404 mounted in the memory card mount unit 403 stores various kinds of file data. The file data can be read and edited by the external apparatus. In addition, file data transferred from the external apparatus can be stored in the memory card 404.

The CPU 405 is a central processing unit that controls the units and others in the printer 103. The program memory 406 includes a ROM or the like, and stores various kinds of program codes and an application 414 for communications with the management server 101. In this embodiment, the application 414 generates a print log based on print information every time a print operation is completed. The print log will be described later in details.

The work memory 407 includes a RAM or the like, and temporarily stores or buffers image data, a job log, and so on in execution of each service. The display unit 408 includes, for example, an LCD and displays various kinds of information to the user. The operation unit 409 includes, for example, a keyboard, a mouse, and so on and receives various input operations from a user. The network communication unit 410 is connected to the router 105 (see FIG. 1) via the network connection unit 411. More specifically, the network communication unit 410 is connected to a network such as the Internet 100 (see FIG. 1) via the network connection unit 411, and performs various communications. As a communication protocol, HTTP or XMPP may be employed, but any other protocol may be also used. The flash memory 412 is a non-volatile memory for storing image data and others received by the network communication unit 410. The units and others described above are connected to each other via a bus 413.

Although this embodiment uses the multifunctional printer, namely, the printer 103 as an example of the image processing apparatus, the image processing apparatus may be a copier, a facsimile, or the like as long as it has a configuration to implement print functions. The image processing apparatus may be a printer not equipped with the scan functions.

Figure 5:
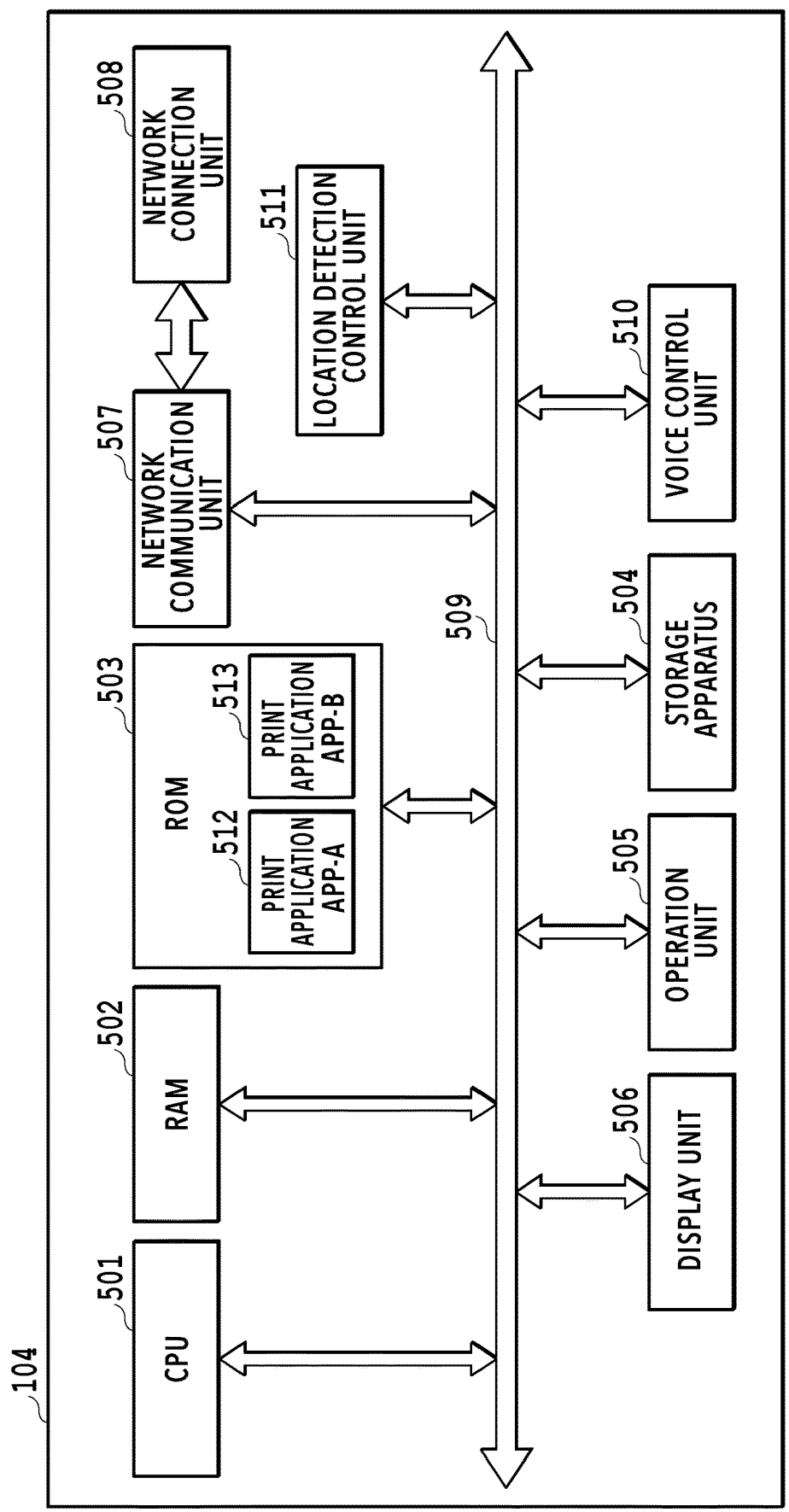
FIG. 5 is a diagram illustrating an example of a hardware configuration of a mobile terminal.

FIG. 5 is a diagram illustrating an example of a hardware configuration of the mobile terminal 104. The mobile terminal 104 includes a CPU 501, a RAM 502, a ROM 503, a storage apparatus 504, an operation unit 505, a display unit 506, a voice control unit 510, a location detection control unit 511, a network communication unit 507, and a network connection unit 508.

The CPU 501 is a central processing unit that controls the units and others in the mobile terminal 104. The RAM 502 is a work memory needed by the CPU 501 for execution of programs. The ROM 503 is a read-only memory for storing an operating system, a communication control application, a printing control application, and so on. The operating system and print applications 512 and 513 stored in the ROM 503 are read, expanded on the RAM 502, and executed by the CPU 501. The ROM 503 in this embodiment stores two print applications 512 and 513 through which desired images are created and the printer 103 is caused to perform print operations based on the created images. Here, the print application 512 is a New Year's card application APP-A for New Year's card editing and the print application 513 is a photo application APP-B for photo-editing.

The storage apparatus 504 is a non-volatile memory, and stores setting parameters and operation logs of various operation modes required after the mobile terminal 104 is restarted. The operation unit 505 includes, for example, a keyboard, a mouse, and so on and receives various input operations from a user. The display unit 506 includes, for example, an LCD and displays various kinds of information to the user. The network communication unit 507 is connected to the router 105 via the network connection unit 508. More specifically, the network communication unit 507 is connected to a network such as the Internet 100 (see FIG. 1) via the network connection unit 508, and performs various communications. The network communication unit 507 supports a wireless LAN.

The voice control unit 510 is activated by a call application under an instruction of the CPU 501 in an event such as one where the user is making a call. The CPU 501 inputs and outputs voice data via a microphone and a speaker not illustrated, while the voice control unit 510 acts as an intermediary between the control program and the CPU 501. The location detection control unit 511 obtains location information of the mobile terminal 104 from a GPS sensor, and provides the location information to the operating system. The units and others described above are connected to each other via a bus 509. Although this embodiment employs the mobile terminal 104 as an example of the information processing apparatus, the information processing apparatus may be, for example, a PC or the like.

Figure 6:
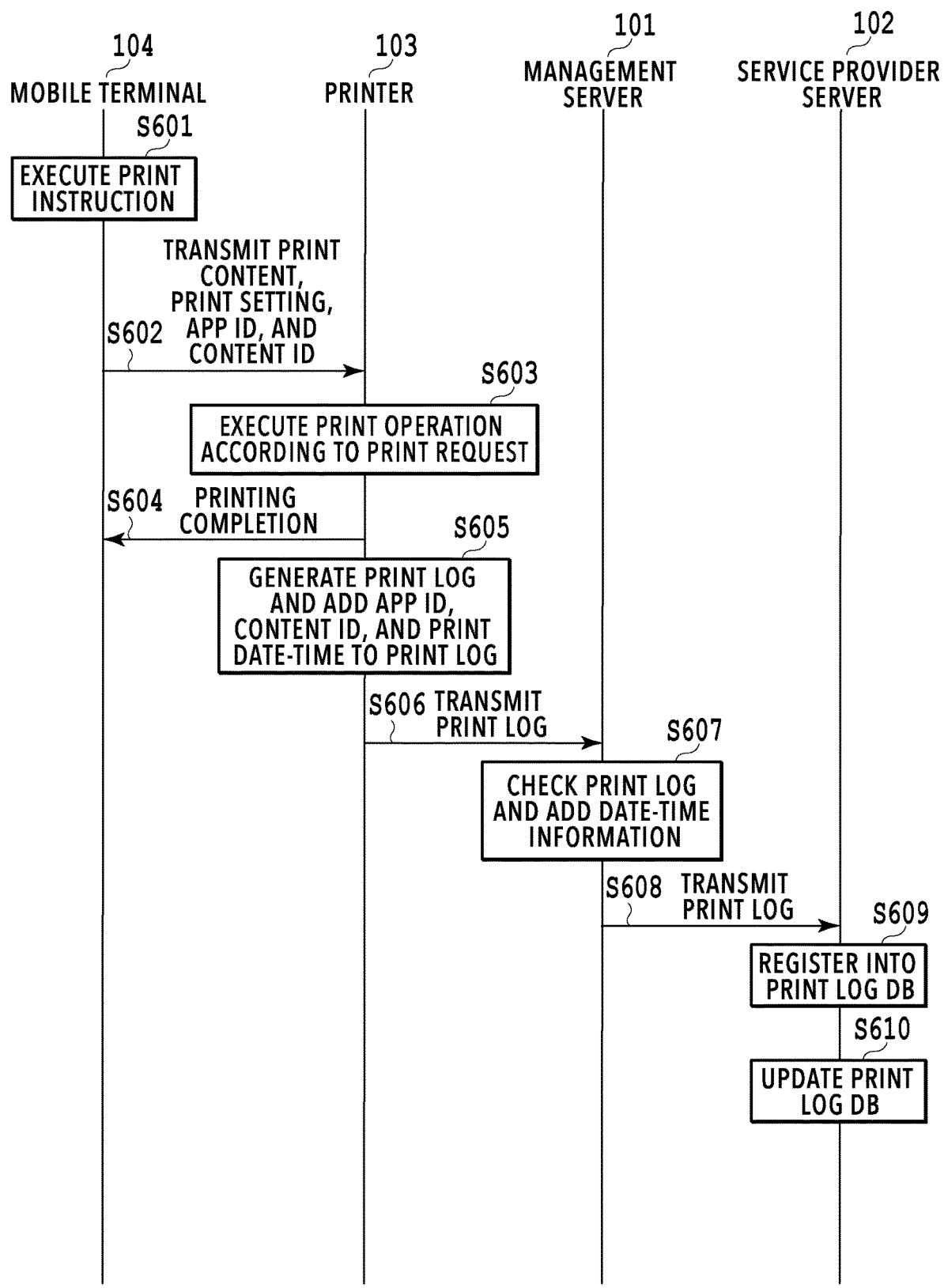
FIG. 6 is a diagram illustrating information processing steps in a case where a mobile terminal transmits a print instruction.

FIG. 6 is a diagram illustrating information processing steps in the mobile terminal 104, the printer 103, the management server 101, and the service provider server 102 in a case where the mobile terminal 104 transmits a print instruction. The processing illustrated in FIG. 6 is executed by the CPUs in the mobile terminal 104, the printer 103, the management server 101, and the service provider server 102 expanding program codes recorded in disk apparatuses and the like on the RAMs and executing the program codes. Instead, functions in some or all of steps in FIG. 6 may be implemented by hardware such as an ASIC or an electronic circuit. Here, sign "S" in description of each process indicates a step in this sequence diagram.

In a case where the user instructs a print operation through an application of the mobile terminal 104 (S601), the print application 512 or 513 in the mobile terminal 104 transmits a print instruction to the printer 103 (S602). A command for the print instruction includes information on the application ID of the print application used, a print content (image data), a content ID associated with the print content, a sheet type, a sheet size, a print quality and so on.

In response to reception of the print instruction, the printer 103 executes the print operation according to the received print instruction (S603). To be more precise, the printer 103 prints the image according to the received image data based on the specified sheet type, sheet size, and print quality. Upon completion of the print operation, the printer 103 notifies the mobile terminal 104 of the completion of the printing (S604).

Subsequently, the printer 103 generates a print log based on the information on the current print operation (S605). Specifically, the printer 103 adds, to the information on the print operation executed in S603 such as the application ID and the content ID, information such as a print time and amounts of inks remaining at the completion of the print operation, and stores the resultant information as the print log. The print log is snapshot information captured at the execution of the print operation by the printer 103.

Figure 7:
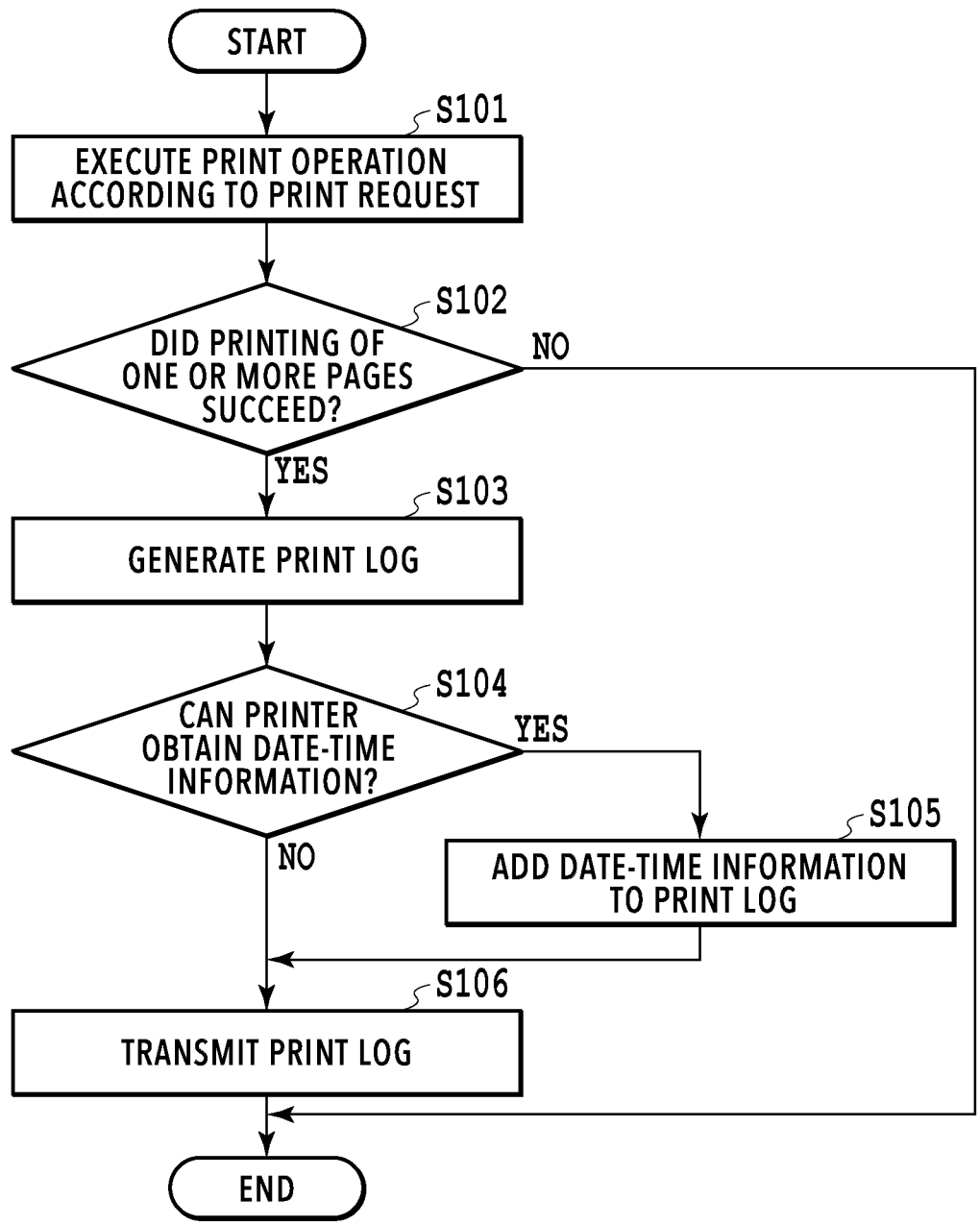
FIG. 7 is a flowchart for explaining steps executed by the printer.

FIG. 7 is a flowchart for explaining steps executed by the printer 103 after reception of a print instruction from the mobile terminal 104 until transmission of a print log to the management server 101. This processing covers S602 to S606 in FIG. 6, and specifically is executed by the CPU 405 in the printer 103 according to a program stored in the program memory 406 (see FIG. 4).

In response to reception of a print instruction from the mobile terminal 104, the printer 103 first executes a print operation according to the received print instruction at S101. Specifically, the printer 103 prints an image according to the image data contained in the print instruction based on the specified sheet type, sheet size, and print quality.

At S102, the printer 103 determines whether the print operation of one or more pages was successfully executed at S101. If it is determined that the print operation of one or more pages was not successfully executed, the processing ends. On the other hand, if it is determined that the print operation of one or more pages was successfully executed, the processing advances to S103.

At S103, the printer 103 generates the print log based on the contents in the print instruction received from the mobile terminal 104. Specifically, the printer 103 extracts information such as the application ID and the content ID from the received print instruction and temporarily stores the information as the print log.

At S104, the printer 103 determines whether information on the current date-time can be obtained. For example, if the printer 103 is in itself equipped with a timer or can obtain the information on the current date-time by means of a communication function, the printer determines that the information on the current date-time can be obtained and advances to S105.

At S105, the printer 103 obtains the information on the current date-time, and adds the obtained information as print date-time information to the print log stored at S103. For example, at the completion of the printing, the printer 103 reads the equipped timer and records year/month/day/hour/minute/second based on the obtained information into the print log. On the other hand, if it is determined at S104 that the current time cannot be obtained, the printer 103 advances directly to S106.

At S106, the printer 103 transmits the generated print log to the management server 101 via the Internet 100. This processing ends after the above step.

FIG. 8 is a diagram illustrating an example of a print log generated by the printer 103. FIG. 8 illustrates a case where a user inputs an instruction to print an illustration of Mt. Fuji on post cards by using the print application 512 for New Year's card editing through the mobile terminal 104. Hereinafter, each of items is briefly described.

Print date-time indicates a time point at the completion of the printing by the printer 103. This information is added at S105 in FIG. 7. In the case where the printer 103 does not include a time obtaining unit such as a timer, in short, where NO is determined at S104 in FIG. 7, null data or a notification that the information could not be obtained is recorded.

Printer identifier is a printer ID uniquely identifying the printer 103 and is a serial number assigned during the manufacturing of the printer. A model name is a character string indicating the model name of the printer 103.

Remaining ink amount is information indicating the amount of each ink remaining at the completion of printing by the printer 103. The remaining ink amount is managed for each type of ink mountable in the printer 103. For example, "1" is recorded in the case where the ink remains, "2" is recorded in the case where the ink is exhausted, and "3" is recorded in the case where whether the ink remains or not is unknown. FIG. 8 illustrates the case where cyan (C), magenta (M), yellow (Y), and black (K) inks are mounted on the printer 103, and all these color inks are in the ink remaining state of "1".

Print application indicates the application ID unique to the print application that transmitted the print instruction to the printer 103. In this embodiment, out of the print application 512 (APP-A) and the print application 513 (APP-B) installed in the mobile terminal 104, the print application 512 (APP-A) that actually transmitted the print instruction is recorded. The print application 512 in the mobile terminal 104 transmits a print instruction including its own application ID (APP-A) (S602), and the printer 103 records this information "APP-A" as an entry of "print application" in the print log. In a case where the print application 513 transmits a print instruction, information recorded as "print application" in the print log is "APP-B". This example illustrates the case where the mobile terminal 104 transmits the print instruction. Instead, in a case where a print application installed in, for example, a PC transmits a print instruction, the ID of this print application is stored in the print log.

Print content information is the content ID which is an identifier of an image content printed, and which is contained in the print instruction and transmitted by the print application. For example, in the case where the image content is "New Year's card-Mt. Fuji illustration", the print application 512 transmits the print instruction containing the content ID "A111111" representing "New Year's card-Mt. Fuji illustration". FIG. 8 illustrates the state where the printer 103 records this information "A111111" as "print content information" in the print log.

Sheet type is an identifier of a sheet type for image printing. For example, the sheet type is "1" in a case of photo paper, is "2" in a case of plain paper, and is "3" in a case of postcard. Sheet size is an identifier of a sheet size for image printing. For example, the sheet size is "1" in a case of photo size, is "2" in a case of A4, and is "3" in a case of postcard size. Printed page count is information indicating the number of pages on sheets on which images were printed. For example, in the case where texts on 5 pages are printed on 5 sheets, the printed page count is "5". Here, in the case of blank printing, the page is not counted. Instead, in the case of multiple pages printing such as 2 in 1, printing of even two pages is counted as one page. In the case of double-sided printing, even one sheet is counted as two pages. The above-described information on "sheet type", "sheet size", and "printed page count" is information contained in the print instruction and transmitted by the print application.

The above-described items are not intended to limit this embodiment, in particular. For example, it is possible to add other items such as a setting of whether printing is color printing or monochrome printing, and a date-time at which each ink tank mounted in the printer 103 started to be used. Instead, some of the items presented in FIG. 8 may be omitted. In any case, the information recorded in the print log is not cumulative information but is snapshot information at the time when the printer 103 actually performed a print operation.

The description is returned to FIG. 6. After generating the print log as illustrated in FIG. 8 at S605, the printer 103 transmits the generated print log to the management server 101 via the Internet 100 (S606). In response to reception of the print log, the management server 101 checks whether the received print log complies with a predetermined format. Then, the management server 101 adds reception date-time information to the print log if necessary (S607) and then transmits the updated print log to the service provider server 102 via the Internet 100 (S608).

Figure 9:
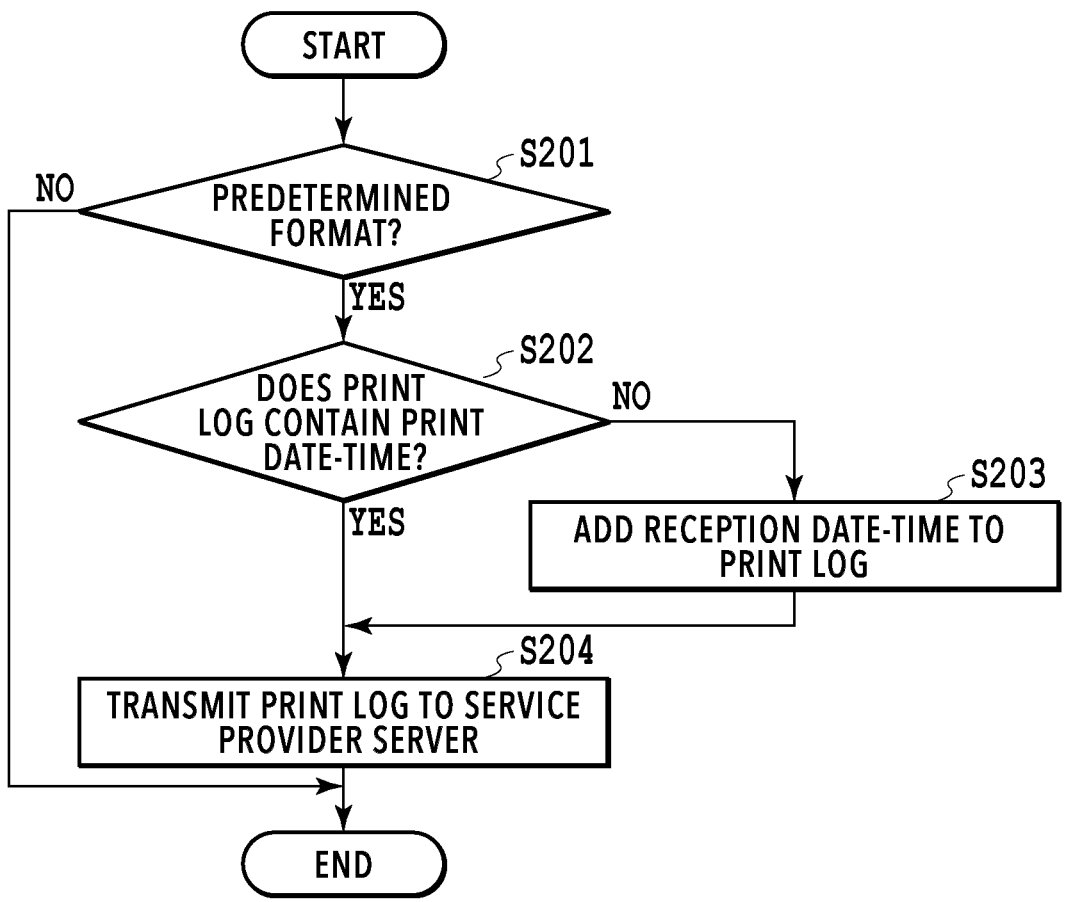
FIG. 9 is a flowchart for explaining steps executed by the management server.

FIG. 9 is a flowchart for explaining steps executed by the management server 101 after reception of a print log from the printer 103 until transmission of the print log to the service provider server 102. This processing covers S607 and S608 in FIG. 6, and specifically is executed by the CPU 201 in the management server 101 according to a program stored in the ROM 203 (see FIG. 2).

In response to reception of a print log from the printer 103, the management server 101 first checks whether the received print log complies with the predetermined format at S201. If it is determined that the received print log does not comply with the predetermined format, the management server 101 recognizes the received print log as an invalid log, and ends this processing. On the other hand, if it is confirmed that the received print log complies with the predetermined format, the management server 101 advances to S202.

At S202, the management server 101 determines whether the received print log contains the print date-time information. If it is determined that the print date-time information is not contained, the management server 101 advances to S203, adds information on a time at which the print log was received to the print log, and then advances to S204. On the other hand, if it is determined that the print date-time information is contained at S202, the management server 101 directly advances to S204.

At S204, the management server 101 transmits the print log in the latest state to the service provider server 102 via the Internet 100. This processing ends after the above step.

Again, the description is returned to FIG. 6. In response to reception of the new print log from the management server 101, the service provider server 102 registers this print log to a print log database (S609), and also updates a print application database (S610).

Here, description is given of contents in information managed by the service provider server 102.

FIGS. 10A and 10B are tables which are stored in advance in the service provider server 102 and which present associations of the application names and content names with their respective IDs. In reference to the tables illustrated in FIGS. 10A and 10B, the service provider server 102 can know which print application was used and what image content was recorded in the print operation based on the IDs recorded in the received print log. For example, in the case where the entry of "application ID" in the received print log is "APP-A", the service provider server 102 can recognize that the print application 512 for New Year's card editing was used in the print operation. Instead, in the case where the entry of "application ID" is "APP-B", the service provider server 102 can recognize that the print application 513 for photo-editing was used in the print operation.

In addition, in the case where the entry of "content ID" in the received print log is "A111111", the service provider server 102 can recognize that "New Year's card-Mt. Fuji illustration" was printed in the print operation. Instead, in the case where the entry of "content ID" is "B222222", the service provider server 102 can recognize that "greeting card" was printed in the print operation. FIGS. 10A and 10B each present two rows as an example, but the tables actually store and manage three or more application names and content names.

FIGS. 11A to 11D are diagrams illustrating examples of various databases stored in the storage apparatus 204 of the service provider server 102.

FIG. 11A illustrates a user management database. The user management database stores user ID, user's email address, printer ID, printer serial number, and printer model name in association with each other. A record stored for each user ID in the user management database is generated in an event where the user subscribes to the service, and is deleted in an event where the user unsubscribes to the service. The printer ID is a printer-specific character string based on which the service provider server 102 uniquely identifies the printer, and is generated in the event of the service subscription. The serial number and the model name correspond to the serial number of the "printer identifier" and the stored information on the "model name" described in reference to FIG. 8.

FIG. 11B illustrates a print log database. The print log database stores printer ID, application ID, content ID, sheet type, sheet size, printed page count, and print date-time in association with each other. By referring to the user management database illustrated in FIG. 11A, the service provider server 102 can obtain the printer ID based on the serial number recorded in the received print log. Every time the service provider server 102 receives a print log, the service provider server 102 refers to the user management database and additionally registers the contents in the print log to the print log database. FIG. 11B illustrates only two print logs. However, every time any of printers connected via the network performs a print operation, such a print log is additionally registered.

FIG. 11C illustrates the print application database. The print application database is a database for managing how frequently each of the print applications is used by each printer. The print application database stores the cumulative printed page count in association with each combination of the printer ID and the application ID. Every time a print log is received or at predetermined timing, the service provider server 102 updates the printed page count for the corresponding combination of the printer ID and the application ID based on the print log database having the print log registered therein.

FIG. 11D illustrates a point database. The point database is a database for managing points that each user has earned within a predetermined period in association with the user ID. At predetermined timing, the service provider server 102 searches the print log database and the print application database and updates allotted points in the point database.

While managing the databases in FIGS. 11A to 11D, the service provider server 102 can provide management information to a user in response to a request from the mobile terminal 104 or the like. For example, the service provider server 102 can present information on what content was printed by which print application in the past, and notify each user of how much points the user owns now.

Figure 12:
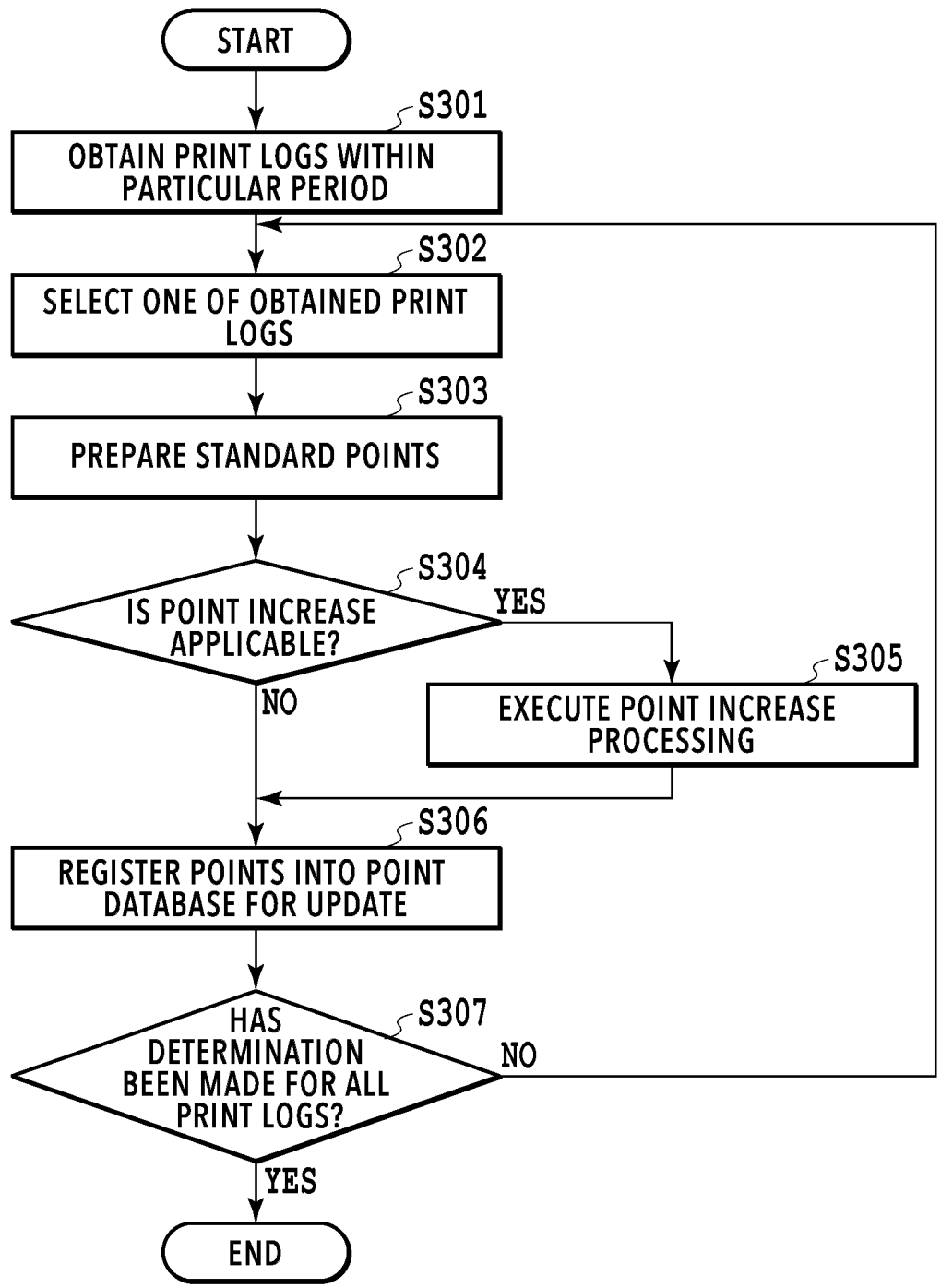
FIG. 12 is a flowchart presenting steps executed by the service provider server.

FIG. 12 is a flowchart for explaining update processing of the point database executed by the service provider server 102. This processing is processing executed by the CPU 301 in the service provider server 102 according to a program stored in the storage apparatus 304 (see FIG. 3). This processing does not have to be executed at a time when a print log is received, but may be executed at predetermined intervals such as, for example, every hour.

At the start of this processing, first at S301, the service provider server 102 searches the print log database illustrated in FIG. 11B and obtains print logs each having a print date-time within a period targeted for aggregate calculation.

At S302, the service provider server 102 selects one of the print logs obtained at S301. At S303, the service provider server 102 prepares standard points for the print log selected at S302.

At S304, the service provider server 102 determines whether a point increase is applicable to the print log selected at S302. A condition for determining whether a point increase is applicable is not particularly limited. The service provider server 102 may make this determination based on various conditions in various items contained in the print log. For example, in a case of "giving additional 10 points to printing during a New Year period", the service provider server 102 may refer to the print date-time in the print log and determine that the point increase is applicable to the print log having the print date-time within the "New Year period". Instead, in a case of "giving double points to printing by the New Year's card application APP-A", the service provider server 102 may refer to the application ID in the print log and determine that the point increase is applicable to the print log having the application ID of "APP-A".

If it is determined at S304 that the point increase is applicable, the service provider server 102 performs predetermined point increase processing at S305 on the standard points prepared at S303. For example, in the case of "giving additional 10 points to printing during a New Year period", the service provider server 102 may add extra 10 points to the standard points prepared at S303. Instead, in the case of "giving double points to printing by the New Year's card application APP-A", the service provider server 102 may double the standard points prepared at S303.

At S306, the service provider server 102 refers to the user management database (FIG. 11A) stored in advance and obtains the user ID associated with the printer ID in the print log selected at S302. Then, the service provider server 102 adds the points prepared at the above steps to the allotted points stored in association with the obtained user ID, thereby updating the data in the point database (FIG. 11D). In this step, if the user ID is not registered yet in the point database, the service provider server 102 newly and additionally registers the points prepared at the above steps and the user ID.

At S307, the service provider server 102 determines whether the point addition processing for all the print logs obtained at S301 is completed. In the case where the print logs to be handled still remain, the service provider server 102 returns to S302 and selects the next print log. In the case where it is determined that the point addition processing for all the print logs is completed, this processing ends.

After that, each user may be notified of his/her allotted points based on the allotted points registered in the service provider server 102, and receive a predetermined service by using the points.

The above description is given of the two examples where points are increased depending on a print time and points are increased depending on a print application type. However, this embodiment is not limited to these two examples. Points may be increased based on other information such as a sheet type or sheet size. Instead, points may be increased based on a combination of two or more items contained in the print log. For example, in a case of "giving triple points to printing during a New Year period by the print application APP-A", the service provider server 102 may triple the standard points if the print date-time and the application ID in the print log satisfy the above two conditions. In addition, the information contained in the print log database of the service provider server 102 is not limited to the items illustrated in FIG. 11B. The print log database may contain various items of information such as a type of ink used, a type of sheet used, and a location where shooting was done by use of the location detection control unit 511 (see FIG. 5), as long as the items each indicate a condition based on which whether a point increase is applicable can be determined.

According to the embodiment described above, it is possible to provide various loyalty program services using points based on various conditions in various items contained in print logs.

Embodiment 2

Also in this embodiment, the print log illustrated in FIG. 8 is generated by using the system configuration described with reference to FIGS. 1 to 6 as in Embodiment 1. Embodiment 2 is different from Embodiment 1 in that users are ranked, and a point management method is changed among ranks.

FIG. 13 is a user rank database for managing the ranks of users. The user ID in the user rank database is the same information as the user ID in the user management database illustrated in FIG. 11A or the user ID in the point database illustrated in FIG. 11C. In the user rank database, each user ID is stored in association with one of multiple ranks such as, for example, gold and silver. At predetermined timing, the service provider server 102 in this embodiment searches the print log database, reviews the rank of each user ID, and updates the user rank database. FIG. 13 presents two ranks named gold and silver, but the rank names are not limited to these and three or more ranks may be set. In addition, the user rank database may be integrated with the point database illustrated in FIG. 11D.

Figure 14:
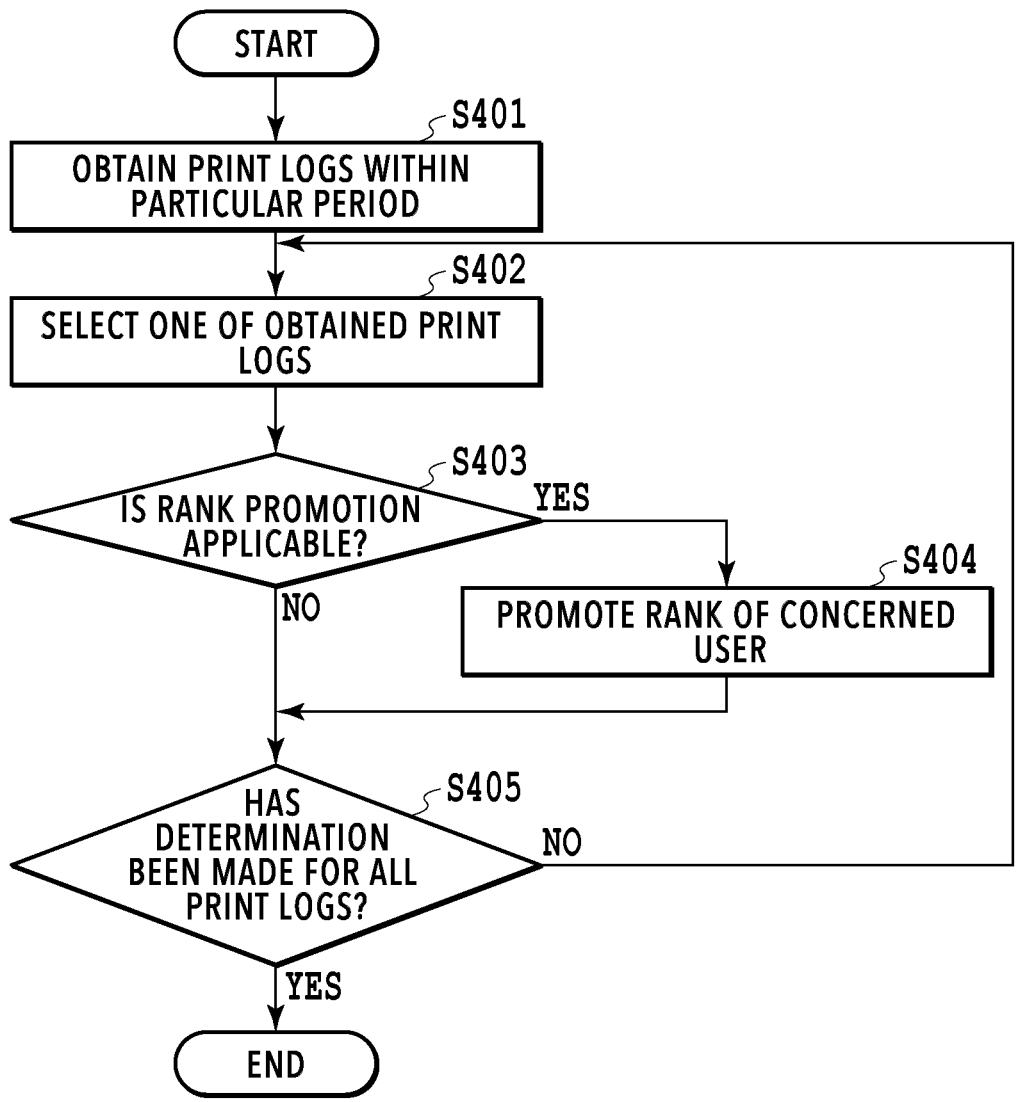
FIG. 14 is a flowchart presenting update processing of the user rank database.

FIG. 14 is a flowchart for explaining user rank determination processing executed by the service provider server 102. This processing is processing executed by the CPU 301 in the service provider server 102 according to a program stored in the storage apparatus 304 (see FIG. 3).

At the start of this processing, first at S401, the service provider server 102 obtains print logs each having a print date-time within a particular period from the print log database illustrated in FIG. 11B.

At S402, the service provider server 102 selects one of the print logs obtained at S401.

At S403, the service provider server 102 determines whether a rank promotion is applicable to the user associated with the print log selected at S402. A condition for determining whether a rank promotion is applicable is not particularly limited. The service provider server 102 may make the determination based on various conditions. For example, in a case of "giving the gold rank to a user who printed more than 100 pages at one time", the service provider server 102 may refer to the printed page count in the print log and determine that the rank promotion is applicable if the printed page count exceeds 100.

If it is determined at S403 that the rank promotion is applicable, the service provider server 102 advances to S404 and performs predetermined rank promotion processing at S305 for the user ID stored in the print log. Specifically, by referring to the user rank database illustrated in FIG. 13, the service provider server 102 changes the rank of the concerned user ID to the gold rank if the rank is not gold, or maintains the rank if the rank is gold.

At S405, the service provider server 102 determines whether the rank determination processing for all the print logs obtained at S401 is completed. If the print logs to be handled still remain, the service provider server 102 returns to S402 and selects the next print log for which the rank determination processing is not completed yet. On the other hand, if it is determined that the rank determination processing for all the print logs is completed, this processing ends.

After that, when the service provider server 102 executes the point addition processing described with reference to FIG. 12, the service provider server 102 applies different point increase processing at S305 depending on the rank of the user. For example, in the case where it is determined at S304 that a point increase is applicable, the service provider server 102 may perform the processing at S305 such as doubling the standard points if the user rank is silver or tripling the standard points if the user rank is gold.

According to the embodiment described above, it is possible to provide various loyalty program services using points based on the user rank in addition to various conditions in various items contained in print logs.

Although the above embodiment determines whether a rank promotion is applicable depending on the printed page count in one print operation, the condition for determining whether a rank promotion is applicable is not limited to this. For example, this determination may be made depending on the print application used or the print content, or may be made depending on the total printed page count within a predetermined period, how many times a particular print application was used within a predetermined period, or any combination of them. In addition, in the above embodiment, only the rank promotion is considered. Instead, for example, processing of demoting the gold rank to the silver rank may be performed in a case where, for example, the total printed page count within a predetermined period is less than a threshold.

Other Embodiments

The embodiments have been described above in the mode where the management server 101 records the reception time as the print time in the case where the printer 103 does not include a time obtaining unit and cannot record the print time into the print log. Instead, the print date-time and the reception date-time may be managed individually.

FIG. 15 is a diagram illustrating print logs in a case where the print date-time and the reception date-time are managed individually. In FIG. 15, the print log in the upper row shows the case where the printer 103 records the date-time information (S605) and the management server 101 also records the reception date-time (S607). In this case, at S301 in FIG. 12 or S401 in FIG. 14, the service provider server 102 obtains print logs by preferentially using the print date-time, and obtains print logs based on the reception date-time from print logs in which the print date-time is not recorded.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-158829, filed Aug. 30, 2019 which is hereby incorporated by reference herein in its entirety.

What is claimed is:

1. A printing apparatus capable of printing an image according to a print instruction transmitted from an information processing apparatus, the printing apparatus comprising:
  at least one processor configured to cause the printing apparatus to act as a plurality of units comprising:
  (1) a reception unit configured to receive the print instruction including (a) image data and (b) at least one identifier among (i) an application ID indicating a print application that outputs the print instruction or (ii) a content ID indicating the image data;
  (2) a storage control unit configured to, based on reception of the print instruction, store, in a memory, the at least one identifier; and
  (3) a transmission unit configured to transmit to a server via a network (a) the at least one identifier stored in the memory and (b) a printer ID indicating the printing apparatus, based on execution of printing based on the print instruction.

2. The printing apparatus according to claim 1, wherein the transmitted at least one identifier is used for a service in which the server gives points to a user ID associated with the printer ID.

3. The printing apparatus according to claim 1, wherein the storage control unit stores at least one piece of information among (a) information on a date-time at which the printing apparatus printed the image according to the print instruction, (b) information on an amount of remaining ink mounted in the printing apparatus, (c) a type of sheet used by the printing apparatus, (d) a size of the sheet, and (e) the number of pages printed by the printing apparatus, while associating the at least one piece of information with the at least one identifier; and
  wherein the transmission unit transmits (a) the at least one piece of information, (b) the at least one identifier, and (c) the printer ID.

4. An information processing system comprising (a) a printing apparatus capable of printing an image according to a print instruction transmitted from an information processing apparatus, and (b) a server system capable of communicating with the printing apparatus via a network,
  wherein the printing apparatus comprises at least one processor configured to cause the printing apparatus to act as a plurality of units comprising:
  (1) a reception unit configured to receive the print instruction including (a) image data and (b) at least one identifier among (i) an application ID indicating a print application that outputs the print instruction or (ii) a content ID indicating the image data,
  (2) a storage control unit configured to, based on reception of the print instruction, store, in a memory, the at least one identifier; and
  (3) a first transmission unit configured to transmit to the server system via the network (a) the at least one identifier stored in the memory and (b) a printer ID indicating the printing apparatus, based on execution of the printing according to the print instruction, and
  wherein the server system comprises at least one processor configured to cause the server system to act as a plurality of units comprising:
  (1) a first reception unit configured to receive the at least one identifier and the printer ID via the network;
  (2) an allotment unit configured to allot points based on the at least one identifier and the printer ID received by the first reception unit; and
  (3) a management unit configured to manage the points allotted by the allotment unit in association with a user ID associated with the information processing apparatus.

5. The information processing system according to claim 4, wherein the at least one processor of the server system further causes the server system to act as a registration unit configured to register the at least one identifier and the printer ID received by the first reception unit as a print log into a database, and
  wherein the allotment unit allots points based on one or more of the print logs registered in the database.

6. The information processing system according to claim 4, wherein the server system comprises (a) a management server and (b) a service providing server,
  wherein the management server (a) receives the at least one identifier and the printer ID transmitted by the first transmission unit via the network, and (b) transmits to the service providing server via the network (i) information on a date-time at which the management server received the at least one identifier and the printer ID, (ii) the at least one identifier, and (iii) the printer ID, and
  wherein the service providing server allots points based on (a) the information on a date-time, (b) the at least one identifier, and (c) the printer ID.

7. The information processing system according to claim 4, wherein the network is the Internet.

8. The information processing system according to claim 4, wherein the allotment unit (a) allots a first point based on a first identifier among the application ID and the content ID, and (b) allots a second point having a different value from the first point based on a second identifier, different from the first identifier, among the application ID and the content ID.

9. The server according to claim 4, wherein the first reception unit further receives at least one piece of information among (a) information on an amount of remaining ink mounted in the printing apparatus, (b) a type of sheet used by the printing apparatus, (c) a size of the sheet, and (d) the number of pages printed by the printing apparatus, and
  wherein the allotment unit allots points based on (a) the at least one piece of information, (b) the at least one identifier, and (c) the printer ID.

10. The information processing system according to claim 4, wherein the server system determines a rank of the user ID based on one or more of the print logs registered in the database, and changes points to be allotted depending on the determined rank.

11. The information processing system according to claim 4, wherein the server system transmits to the information processing apparatus, via the network, information on points managed by the management unit.

* * * * *